Figure 5:
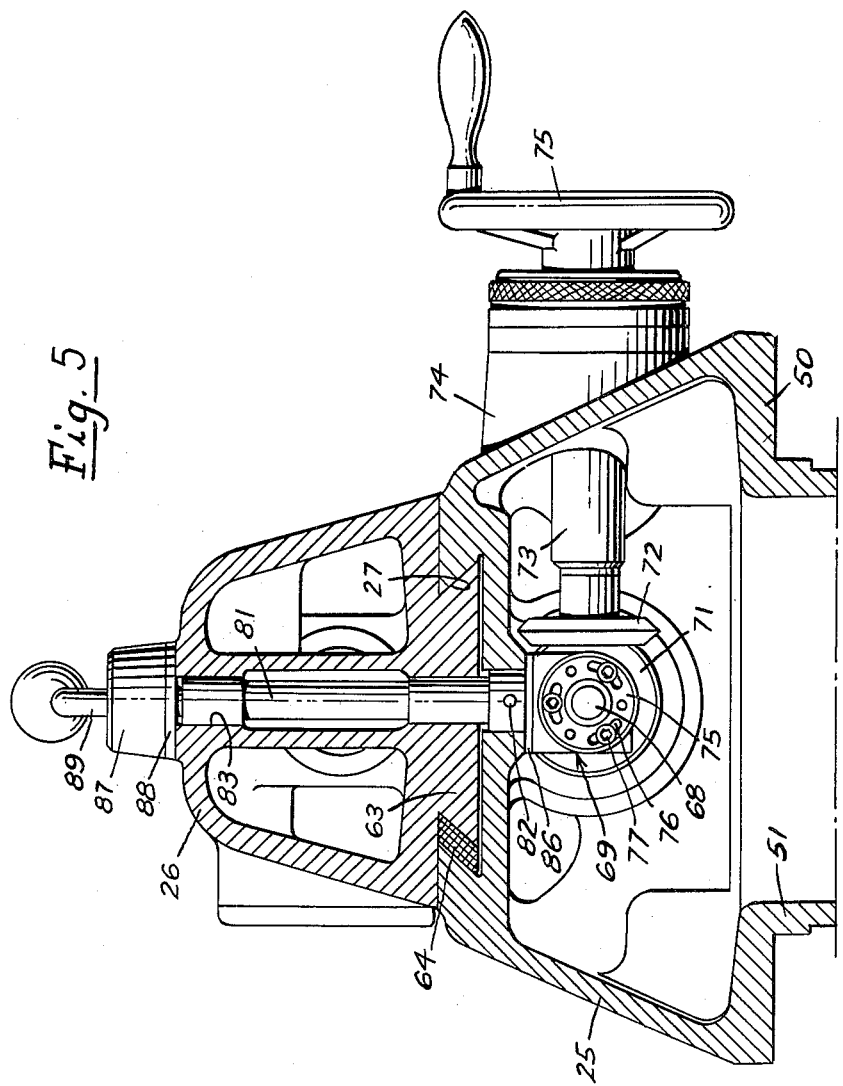

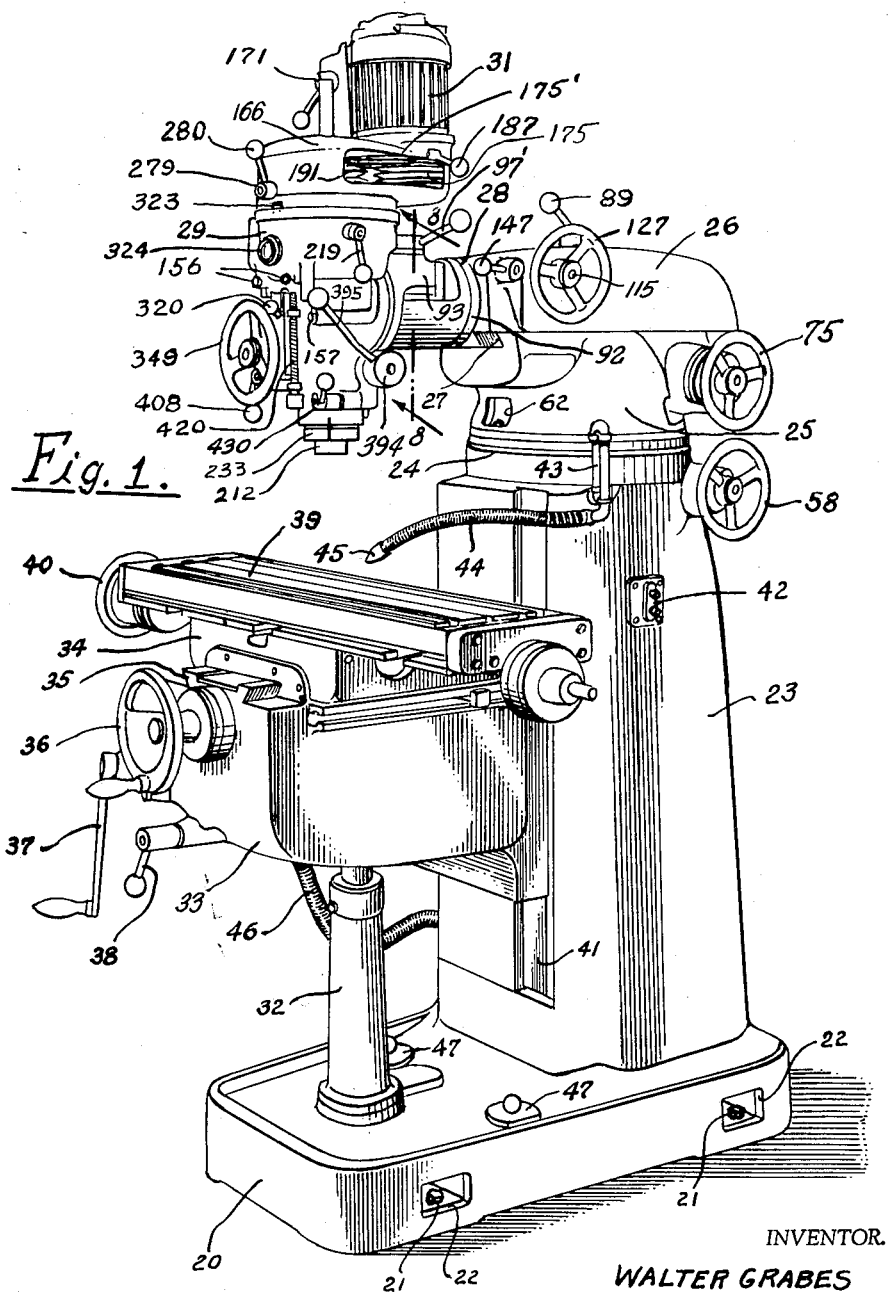

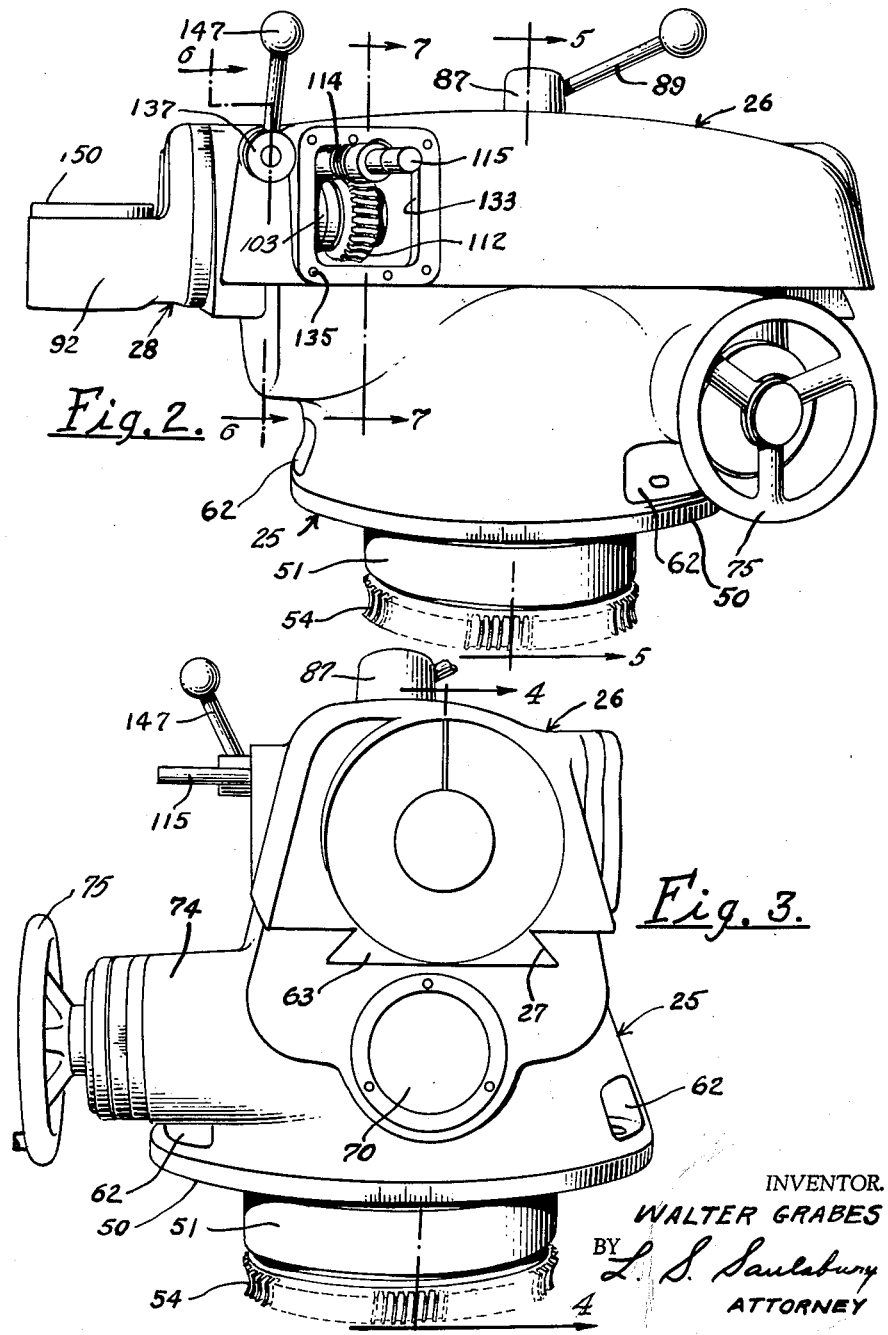

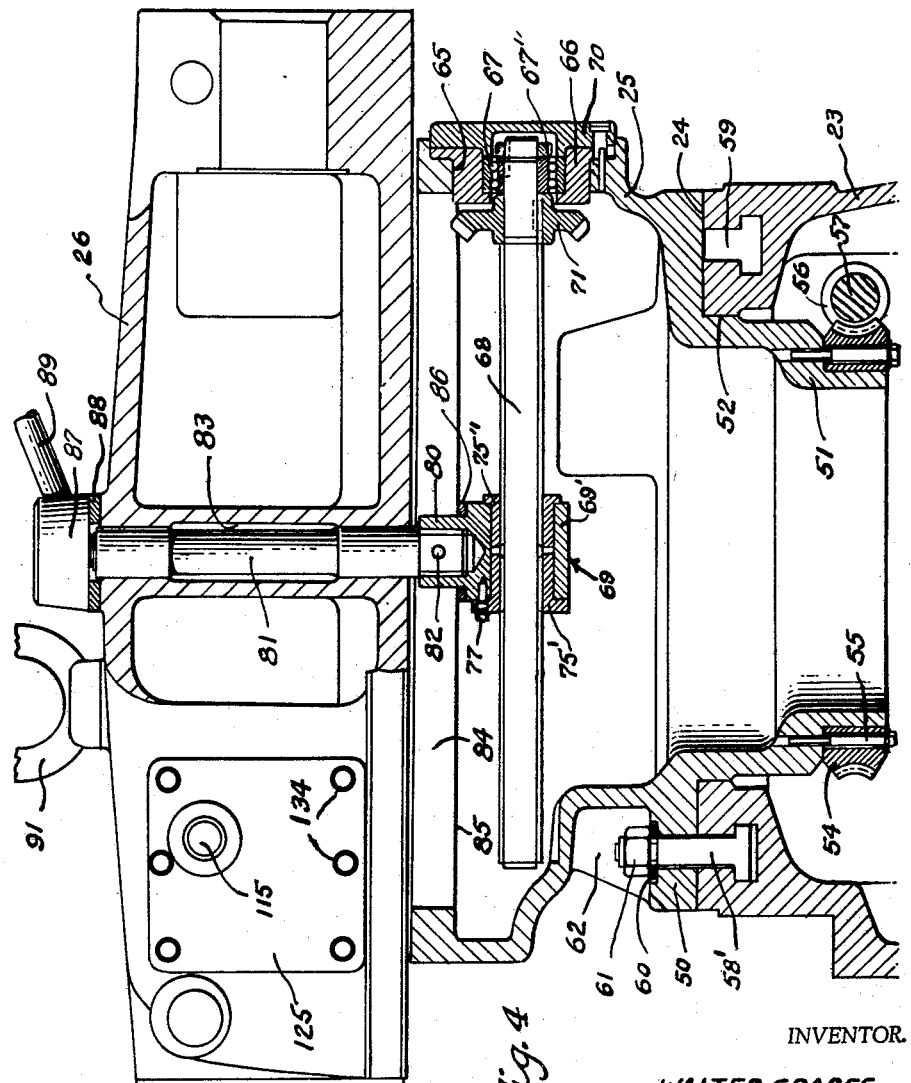

March 12, 1963 W. GRABES 3,080,794
TURRET TYPE VERTICAL MILLING MACHINE
Original Filed Dec. 2, 1953 4 Sheets-Sheet 4

INVENTOR
WALTER GRABES
BY *L. S. Saulsbury*
ATTORNEY

3,080,794
Patented Mar. 12, 1963

3,080,794
TURRET TYPE VERTICAL MILLING MACHINE
Walter Grabes, Bellaire, Tex., assignor, by mesne assignments, to American Tool Engineering, Inc., Bellaire, Tex.
Original application Dec. 2, 1953, Ser. No. 395,758, now Patent No. 2,901,946, dated Sept. 1, 1959. Divided and this application July 10, 1959, Ser. No. 826,371
3 Claims. (Cl. 90—17)

This invention relates to a turret-type vertical milling machine. This application is a division of co-pending application Serial No. 395,758 filed December 2, 1953, now Patent No. 2,901,946.

It is the principal object of the present invention to provide a turret-type vertical milling machine wherein the turret can be hand wheeled throughout three hundred and sixty degrees or turned to any desired position by self-locking worm gearing in a fast positive manner.

It is another object of the invention to provide a turret-type milling machine which has along with the hand-wheel turret rotation, an over arm travel slide that is also hand-wheel controlled and adjusted by self-locking worm gearing in a fast positive manner.

It is another object of the invention to provide a turret type of vertical milling machine having a hand wheel controlled turret and a hand wheel controlled over arm travel slide wherein the head can be also hand-wheel rotated upon the over arm slide throughout three hundred and sixty degrees by self-locking worm gearing in a fast and positive manner and wherein not only may the head be so hand-wheel rotated upon the over arm but the head may also be adjusted through the swivel connector to the right or left of the over arm slide and through an arc of more than one hundred and eighty degrees.

Other objects of the invention are to provide a milling machine which is all hand-wheel controlled, wherein one set up completes most jobs, is simple in construction, easy to set up and adjust, versatile, rugged, and adapted for heavy work, accurate, economical to run and maintain, low cost and efficient and effective in operation.

For other objects and for a better understanding of the invention, reference may be had to the following detailed description taken in connection with the accompanying drawing, in which:

FIGURE 1 is a perspective view of the turret-type milling machine of the present invention, FIG. 2 is a perspective view of the turret over arm slide assembly removed from the vertical support casting, FIG. 3 is a perspective view of the turret and slide assembly removed from the vertical support but with the view being taken looking upon one end of the over arm slide, FIG. 4 is an enlarged sectional view taken generally on the vertical line 4—4 of FIG. 3, FIG. 5 is an enlarged vertical sectional view taken generally on line 5—5 of FIG. 2 and looking in end elevation upon the adjusting screw mechanism for the over arm slide.

Referring now particularly to FIGURE 1, a general description will be made of the machine. This machine is installed upon a concrete foundation carefully prepared and leveled to insure the proper operation of the machine. The machine generally comprises a base portion 20 secured to the concrete foundation by bolts 21 accessible through openings 22 in the sides of the base portion 20. An integral upwardly-extending supporting portion 23 extends upwardly from the base portion 20. The upper end of the vertical portion 23 is machined to provide an annular way 24 on which a turret 25 is supported for rotation.

On the turret 25 is an over arm slide 26 that is adjustable horizontally with respect to the turret in a dovetail guide way 27, FIG. 1, in the turret. On one end of the slide 26 is a split swivel connection 28 that is rotatable upon a horizontal axis and which is also adjustable in a plane normal to the horizontal axis to permit adjustment of spindle head assembly 29 laterally to the left or right of the over arm slide 26. The spindle head 29 is also connected to the swivel connection 28 so that it can be rotatably adjusted thereon about a horizontal axis in a manner thereof as will be clearly set forth hereinafter. The spindle head assembly 29 carries a reversible electric motor 31 to supply power to the spindle and to the feed mechanism for operating the same.

The base portion 20 has a pedestal 32 lying forwardly of the upwardly-extending turret supporting portion 23 on which work holding table assembly 33 is supported. This table assembly is adjustable in the usual manner to adjust the work relative to the tool bit and on which the work is clamped in the usual manner. This table assembly has a top carriage 34 that is adjusted fore and aft upon dovetail projections 35 by a carriage cross travel hand wheel 36. The table assembly 33 is adjusted vertically by a lever 37 and is fixed in its adjusted position by a lock lever 38. Longitudinal travel of a top part 39 of the carriage 34 is effected by a longitudinal travel hand wheel 40. Portions of the table assembly 33 enter a vertical slot 41 in the vertically-extending supporting portion 23 to steady and accommodate the table assembly while being adjusted.

Within the vertical supporting portion 23 is a cooling liquid pump, not shown. This pump is run by an electric motor which is controlled by a press button start and stop switch 42 on the side of the supporting portion 23 and the cooling fluid is delivered from a doubled pipe 43 extending out of the supporting portion 23 and on the lower end of which is a flexible goose neck delivery tube 44 having a nozzle end 45 that can be readily directed toward the cutting bit. The cooling liquid will be collected in the table assembly 33 and returned to the pump through a flexible drain hose 46. Cooling liquid that collects on the base 20 may be returned to the pump by lifting drain covers 47. Since no claim of novelty is being made to the table structure or to the cooling fluid system, further description is not needed. By turning hand wheel 58, rotation of the turret 25 is effected on its annular way 24 and about a vertical axis. By turning hand wheel 75, the over arm slide 26 can be laterally adjusted. The swivel connection 28 and the spindle head 29 are rotated by the hand wheel 127. A lever 89 is used to lock the slide arm 26 to the turret 25. A lever 147 is used to lock the angularly swivel connection 28 to the over arm slide 26. The swivel connection 28 has relatively adjustable parts 92 and 93 and lever 97' serve to lock these parts together. The detailed description of turret 25, over arm slide 26 and swivel connection 28 will now be made.

Referring now particularly to FIGS. 2, 3 and 4, the turret 25 has a bottom annular base portion 50 that engages with the annular way 24 on the upper end of the vertical supporting portion 23, and can be rotated thereover throughout three hundred and sixty degrees. The turret 25 has an annular portion 51 that depends into the upper end of the vertical supporting portion 23 and engages a vertical annular way surface 52 on the upper end of the vertically-extending supporting portion 23. A worm ring gear 54 is fixed to the lower end of the portion 51 by bolts 55. This worm gear meshes with a worm 56, FIG. 4, on a shaft 57 that is journalled transversely in the upper end of the supporting portion 23. The worm gears will normally lock the turret in its adjusted position but to insure against any slight play and when the machine is set up for repeated similar operations, lock bolts 58' are fixed in an annular T-slot 59 in the way 24. Each bolt is made secure by a washer 60 and a nut 61. Each nut lies in a side recess 62 in the turret 25, to which access is easily had with a wrench.

The upper end of the turret 25 has the dovetail guide way 27, FIG. 5, that accommodates depending dovetail projection 63 of the over arm slide 26 which is held against side play therein by a take up slightly tapered wearing gib 64.

The turret 25 has an end opening 65 containing a bushing 66, FIG. 4, and a ball bearing unit 67 that supports a lead screw 68 that extends forwardly and is supported intermediate its length by a depending combined adjustable nut means and lock bolt assembly 69 to be later described. The lead screw 68 is made secure against axial displacement relative to the ball bearing unit 67 by means of a nut 67' threaded on the rear end thereof. A cover plate 70 is secured with the bushing to the turret. Keyed to the rear end of the lead screw 68 adjacent the bushing 66 is a bevel gear 71 that meshes with an adjusting gear 72, FIG. 5, fixed to an adjusting shaft 73 journalled in a boss formation 74 upon the side of the turret 25 and operated by a hand wheel 75 easily accessible to the operator. The nut means and lock bolt assembly 69 depends from the over arm slide 26 so that as the hand wheel 75 is turned to rotate lead screw 68, movement is transmitted to the over arm slide 26 to cause the same to be adjusted laterally with respect to the turret.

The bearing and lock bolt assembly 69 comprises a bushing 69' serving as a support for holding the lead screw 68. Opposed flange nuts 75' and 75" of non-ferrous metal are adjustable upon the lead screw 68 and upon installation are adjusted to permit free movement of the lead screw 68. From time to time it is necessary to take up the natural wear of the flange nuts 75' and 75" and this is done by a slight adjustment of the nut 75' to compensate for wear. The flange nut 75' has three elongated arcuate slots 76 circumferentially-spaced about the flange thereof and having respectively cap screws 77 which are tightened after the take up has been made by the flange nuts 75', FIG. 5.

The bushing 69' has an upwardly-extending sleeve portion 80 into which depends a locking bolt 81 and that is made secure thereto by a rivet 82. This locking bolt 81 extends upwardly through an intermediate vertical opening 83 in the over arm slide 26.

The top of the turret has an elongated slot 84, FIG. 4, whose bottom shoulders 85 on the opposite sides thereof are engaged by a soft metal layer 86 provided about the sleeve portion 80 when the locking bolt 81 is pulled upwardly by a tightening nut 87 and a washer 88 that is brought tightly upon the top surface of the arm 26 around the threaded upper end of the locking bolt 81. A ball handle arm 89 extends from the side of the nut by which the easy tightening and loosening of the nut 87 may be made.

On the top of the over arm slide 26 is a pull ring 91, FIG. 4, for receiving a cable hook of a derrick at times when the upper turret assembly is to be removed from or installed upon the lower end of the supporting portion 23.

The swivel connector angular adjustable part 92 has a horizontally-extending axial portion 103, FIG. 2, to which a worm gear 112 is fixed. A worm 114 on an adjusting shaft 115 meshes with worm gear 112. The adjusting shaft 115 extends transversely out of the over arm slide 26 through an opening 133 and carries the hand wheel 127. The opening 133 will be closed by a removable plate not shown and having screws adapted to enter holes 135, FIG. 2. When the spindle head structure 29 is rotated with the swivel connector 28 by turning handle 127, the swivel connector 28 and the spindle head 29 is fixed in its rotated position by the locking lever 147.

Bolts 156 serve to connect the head structure 29 to the swivel connector part 93 in a manner to allow the spindle head 29 to be angularly adjusted with respect to swivel connector 28. Thus not only may swivel connector 28 be adjusted upon the over arm slide 26 but the parts 92 and 93 may be angularly adjustable with respect to each other so that the spindle head 29 can be adjusted to the right or left of the over arm slide 26. The spindle head structure 29 has a pulley housing 166 on the top thereof. The reversible motor 31 is mounted on top of the pulley housing 166 and has a pulley multi-groove wheel 175 connected with a multi-groove pulley 191 by a belt 175' to drive the spindle head. The ball handle arm 186 can be loosened to free the motor to adjust the pulley belt 175' in different speed grooves of the pulley wheels 175 and 191.

A spindle 212 is rotatable in a vertically-adjustable quill 233 that can be raised and lowered by a handle lever arm 395 extending from its hub 394. The spindle 212 is rotated by hand by turning hand wheel 349. A ball lever arm 219 serves to change gears within the upper part of the housing 153 and the speed of rotation of the spindle 212.

A ball handle lever 289 extending from a collar 279 operates internal braking mechanism for slowing down the rotation of the spindle upon completing a work operation. A ball handle lever 320 is adjustable to regulate the feed speed of the spindle quill 233. The spindle housing is supplied with oil by removing a plug 323, FIG. 1, and the level of the oil in the housing may be observed through a window gauge fitting 324.

An operating arm 408 is used to change the direction of power feed of the spindle. A screw 420 having stop nut thereon is used to limit the stroke of the spindle and effect its automatic reversal. The detail description of the spindle head 29 will be found in the above mentioned application, Serial No. 395,758, of which this application is a division.

It should be apparent that there has been provided a turret type vertical milling machine which is adapted to carry on different operations of milling, boring, drilling and so forth, wherein all the adjustments of the spindle head can be effected with hand wheels, operable upon the turret to turn the same through three hundred and sixty degrees, operable upon the overarm slide to move the same across the top of the turret and operable upon the swivel connector to rotate the same upon the overarm slide.

While various changes may be made, it shall be understood that such changes shall be within the spirit and scope of the present invention as defined by the appended claims.

What is claimed is:

1. A turret type vertical milling machine comprising a base portion, a vertical supporting portion extending upwardly from the base portion, a work supporting structure adjustable upon the base portion and guided by the vertical supporting portion, a turret mounted for full rotation upon the upper end of said vertical supporting portion, said turret having a portion depending into the vertical supporting portion, a worm ring gear on said depending portion and a hand wheel controlled worm pinion mounted on the vertical supporting portion and meshing with said worm ring and having a hand wheel to effect the turning of the worm, said turret having a dovetail groove extending across the top thereof, an overarm slide having a dovetail projection mating with said dovetail groove, a threaded shaft extending longitudinally of and below the groove and journalled on the turret, said shaft having a gear secured thereon, said overarm slide having a depending nut means receiving said shaft, a hand wheel adjusting gear mating with the gear secured on said shaft and having a hand wheel secured thereto and extending outwardly from the turret and easily accessible to the operator of the machine, whereby the turret and the overarm slide will be hand wheel controlled, and a spindle head structure connected to one end of the overarm slide.

2. A turret type vertical milling machine as defined in claim 1, and said depending nut means having a lock bolt projection extending upwardly through the top of the overarm slide and a shoulder engageable with the turret, lock nut means accessible at the top of the slide and adapted to tighten the bolt projection and the depending nut means upon the turret to lock the slide thereto in its adjusted position.

3. In a combined turret and overarm slide for vertical milling machines a turret having a dovetail guideway means in the top thereof, an overarm slide having dovetail guideway means mating with the guideway means of the turret, a threaded shaft journalled on said turret and extending parallel to the overarm slide therebeneath, hand wheel control means for turning said screw, depending nut means secured to said threaded shaft and supported from said overarm slide, said depending nut means including a bushing and flanged nuts extending in the opposite ends of the bushing and receiving said threaded shaft, one of said flange nuts being adjustable upon the shaft and relative to the other flange nut to take up the wear of the shaft threads and means for fixing the adjustable flange nut to the bushing and in its adjusted position thereupon.

References Cited in the file of this patent

UNITED STATES PATENTS

| 845,379 | Thomas et al. | Feb. 26, 1907 |
| 1,543,242 | Allen | June 23, 1925 |
| 2,126,990 | Grares | Aug. 16, 1930 |
| 2,275,291 | Bannow | Mar. 3, 1942 |
| 2,349,004 | Richards | May 16, 1944 |

FOREIGN PATENTS

| 1,974 | Great Britain | 1871 |
| 12,392 | Great Britain | 1902 |
| 133,529 | Switzerland | Aug. 16, 1929 |